United States Patent [19]

Dennis

[11] 3,925,611

[45] Dec. 9, 1975

[54] COMBINED SCRAMBLER-ENCODER FOR MULTILEVEL DIGITAL DATA

[75] Inventor: Thomas Mann Dennis, Oakhurst, N.J.

[73] Assignee: Bell Telephone Laboratories, Incorporated, Murray Hill, N.J.

[22] Filed: Aug. 12, 1974

[21] Appl. No.: 496,529

[52] U.S. Cl. .................. 178/22; 178/68; 325/38 A; 340/347 DD

[51] Int. Cl.² ......................... H04L 3/00; H04L 9/00

[58] Field of Search .............. 178/22, 68; 325/38 A; 340/347 DD, 146.1 AL

[56] References Cited

UNITED STATES PATENTS

| | | | |
|---|---|---|---|
| 3,649,915 | 3/1972 | Mildonian, Jr. | 325/38 A |
| 3,753,113 | 8/1973 | Maruta et al. | 340/347 DD |
| 3,784,743 | 1/1974 | Schroeder | 178/22 |
| 3,829,779 | 8/1974 | Fujimoto | 340/347 DD |

*Primary Examiner*—Malcolm F. Hubler
*Assistant Examiner*—H. A. Birmiel
*Attorney, Agent, or Firm*—J. P. Kearns

[57] ABSTRACT

A high-speed digital data transmission system combines quadrature amplitude modulation with scrambling-descrambling, differential amplitude coding-decoding, and Gray-to-rotational coding-decoding of multilevel data symbols channeled at baseband, i.e., including frequencies extending down to zero, onto parallel bit streams with a minimization of error multiplication. Scrambling and descrambling facilitate timing recovery and equalizer adjustment. Differential and rotational encoding and decoding compensate for phase ambiguities in the signal constellation, i.e., points on a space diagram representative of the tips of multilevel symbol vectors.

10 Claims, 7 Drawing Figures

COMBINED SCRAMBLER-ENCODER FOR MULTILEVEL DIGITAL DATA

FIELD OF THE INVENTION

This invention relates to coding of continuous digital data signal patterns in electrical communication systems. For this purpose the term coding is interpreted to include randomization to generate an adequate number of signal-wave transitions as well as signal structuring to minimize phase ambiguities in phase-modulated systems.

BACKGROUND OF THE INVENTION

A convenient modulation arrangement for highspeed digital data transmission systems involves the modulation of independent serial data streams on quadrature (or synonymously orthogonal) components of a single carrier wave and is known as quadrature amplitude modulation (QAM). Each quadrature carrier component is double-sideband modulated with one of the data streams. Due to the orthogonal relationship between the carrier-wave components, the two carrier-channel data streams are non-interfering at proper sampling instants in the absence of amplitude and phase distortion in the transmission medium.

When each of the quadrature components is modulated by synchronous binary signals, there are only four possible resultant vectors and they position themselves at odd multiples of 45 electrical degrees with respect to the orthogonal axes. Such vectors can be successfully demodulated without error as long as the demodulating carrier-wave phase is within 45° of its nominal value. This is binary QAM in which the equivalent serial binary data rate is doubled without any noise or bandwidth penalty over pure binary transmission.

When the number of levels for each orthogonal carrier component is doubled again to four, however, a 16-point signal space diagram is required to define the vectors representing all possible 4-bit combinations. There are a large number of two-dimensional signal space diagrams, as described for example by G. J. Foschini, R. D. Gitlin and S. B. Weinstein in their article entitled "On the Selection of a Two-Dimensional Signal Constellation in the Presence of Phase Jitter and Gaussian Noise," published in the *Bell System Technical Journal* (Vol. 52, No. 6, July/August 1973). In the sixteen-point diagrams shown in FIGS. 3 and 4 of the Foschini et al. article, each signal point encodes four bits, two each from the in-phase (horizontal) and quadrature-phase (vertical) axes. As further shown in their FIG. 2, phase jitter and noise can move the received signal vector completely out of its detection region.

Another problem associated with the detection of multipoint signal vectors arises from phase ambiguities in the demodulating carrier wave wherein the complete diagram is rotated between axes of symmetry, i.e., by a multiple of a whole quadrant in the case of quadrature axes. From the prior art it is known that Gray coding (reflected binary), i.e., coding in which there is permitted only one bit change between discrete levels, is effective in minimizing errors due to noise. The phase ambiguity problem has not heretofore been solved in the present context.

In any high-speed synchronous data transmission system, the presence of an adequate number of zero-crossing transitions must be preserved in order to generate at the receiver a properly phased sampling wave.

Scramblers, as described in U.S. Pat. No. 3,515,805 issued to R. D. Fracassi and J. E. Savage on June 2, 1970, are regularly employed for this purpose. Scramblers remap data sequences having either long periods without transitions or short repetitive periods into substantially random sequences. The self-synchronous scrambling principle disclosed by Fracassi et al. and applied by them to serial data was extended to parallel synchronous data streams by H. C. Schroeder in his U.S. Pat. No. 3,784,743 issued Jan. 8, 1974.

It is an object of this invention to combine coding of parallel synchronous data streams for scrambling purposes with coding for energy-level, zero-crossing noise and phase ambiguity compensation.

It is another object of this invention to encode and decode parallel synchronous data streams in a manner to compensate jointly for sparse signal transitions, non-uniform transmitted energy level, and phase ambiguity while minimizing error multiplication due to coding errors.

SUMMARY OF THE INVENTION

According to this invention, a quadrature amplitude modulation (QAM) data transmission system using a plurality of data bits per symbol is multiplexed, demultiplexed, scrambled, descrambled, and differentially and rotationally encoded and decoded in a coordinated manner on a plurality of rails at baseband frequencies. Multiplexing and demultiplexing involve the distribution of a common serial data signal among the plurality of separate rails or the assignment of independent parallel data signals to less than all of the plurality of available rails. Scrambling and descrambling relate to the generation of sufficient zero-level crossings to assure an even energy distribution on the transmission channel for automatic gain and equalizer control and for sample timing recovery at the receiver. Differential and rotational encoding and decoding compensate for phase ambiquities among sectors of symmetry while minimizing error multiplication probabilities.

In an illustrative embodiment, a single, high-speed serial data train (or two or more lower-speed serial data trains) is distributed among synchronous data trains on parallel rails for application to and removal from a band-limited transmission channel whose baud or symbol rate is chosen somewhat smaller than the channel bandwidth. In the illustrative embodiment, each of four rails carries one data bit of a parallel set of four. In the modulation process the bits on the odd-numbered rails modulate one quadrature carrier-wave component and the bits on the even-numbered rails modulate the other carrier-wave component. Effectively, four bits are transmitted simultaneously over the transmission channel to realize an equivalent binary data rate substantially equal to the channel bandwidth multiplied by the number of parallel data rails.

At the transmitting terminal a self-synchronizing, long-period key signal is derived from the data stream on one rail and applied to that data stream to form a first scrambled data stream. The first scrambled data stream, after differential delay, is further combined with one or more data streams on other rails to form additional scrambled data streams. Two unscrambled data streams are combined to identify the quadrant of the signal space diagram in which the vector being coded lies and to convert the quadrantal coding between reflected and pure binary codes. The increments between the most significant bits of each signal vector being transmitted and those of the next signal vector are determined and these increments are used to augment the last transmitted signal to form the next transmitted signal vector and thus to mitigate error multiplication. In order for increments to be obtained, all bits are delayed by one symbol interval. Finally, the remaining bits are rotationally encoded from a format which makes it possible to remove the quadrantal-phase ambiguity from the received signal to a bilaterally symmetrical line signal format.

At the receiver terminal, after demodulation the inverse of the coding steps taken at the transmitting terminal is performed.

The term "error multiplication" refers to the tendency of an error once made to generate additional errors, because a particular bit is used more than once in any coding arrangement. For example, from the viewpoint of the scrambler, an error applied to its input appears immediately at its output as well as being propagated through the multistage key-signal forming shift register. When this error reaches stages which feed back to the input through exclusive-OR gates, this error again traverses the shift register with the result that the original error is multiplied by a factor equal to one plus the number of shift register stages whose outputs are returned to the input.

Any coding scheme is subject to error multiplication. In the absence of scrambling, a single error would remain a single error. Were the entire message to be transmitted in a single serial stream with differential coding and scrambling, the error multiplication factor would be six, of which a factor of two can be ascribed to differential decoding and a factor of three to descrambling. With the combined scrambling and differential coding according to this invention in which all coding is performed on parallel streams, the error multiplication is reduced nearly to four with the probabilities of error fairly evenly spread among the four parallel streams.

It is a feature of this invention that scrambling, differential coding and rotational coding are accomplished using conventional circuits realizable in integrated circuit form.

BRIEF DESCRIPTION OF THE DRAWING

The above and other objects and features of this invention will become apparent from a consideration of the following detailed description and the drawing in which.

DETAILED DESCRIPTION

Figure 1:
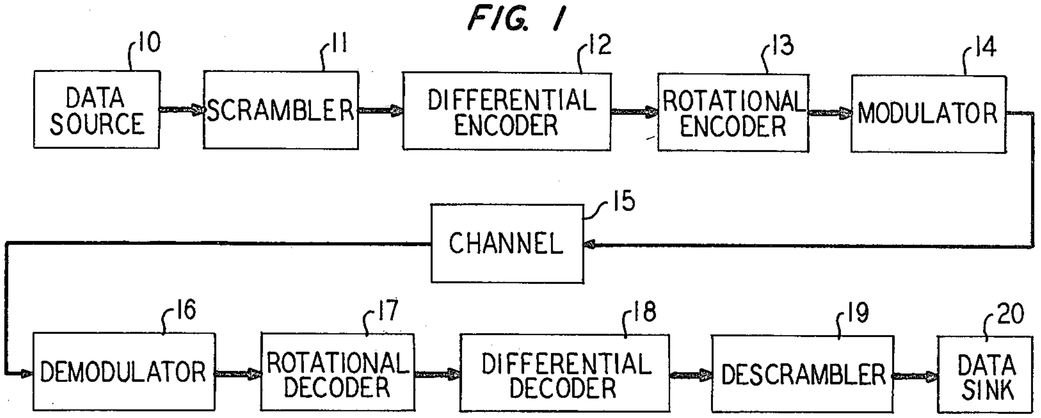
FIG. 1 is a block diagram of an overall highspeed digital data transmission system modified to incorporate the combined coding and scrambling features of this invention.

FIG. 1 illustrates in block diagram form a QAM high-speed digital data transmission system with emphasis on baseband signal processing. In this system two 2400-baud, four-level baseband data signals double-sideband modulate 1650-Hz orthogonal carrier waves. The two modulated carrier waves with the carrier component itself suppressed are combined to yield a common line signal compatible with the transmission characteristics of voiceband telephone channels having 3-decibel levels at 450 and 2850 Hz.

The overall data transmission system comprises a transmitting terminal, a transmission channel and a receiving terminal. As shown in FIG. 1, the transmitting terminal comprises data source 10, scrambler 11, differential encoder 12, rotational encoder 13 and modulator 14. The transmission channel is represented by the single block 15 and is assumed to include the usual sending and receiving filters. The receiving terminal comprises demodulator 16, rotational decoder 17, differential decoder 18, descrambler 19 and data sink 20.

Double-lined connecting arrows between blocks indicate multirail connections. The single lines associated with channel 15 indicate a two-wire telephone private-line transmission path and can be a wire, cable or radio medium.

Data source 10 for purposes of illustration provides up to four parallel synchronized digital data streams which can represent up to four independent messages. Scrambler 11 generates a key signal from the message content on one data stream and combines it with that data stream in accordance with the teachings of the previously cited Schroeder patent. The scrambled data stream so derived can be combined with one or all of the remaining data streams. Differential encoder 12 derives the sum or difference between the presently transmitted signals and the following input signals on two or more parallel rails and augments the presently transmitted signals by this sum or difference in place of the absolute value to form the next transmitted signals to compensate partially for phase ambiguities in the demodulating carrier wave. Rotational encoder 13 operates on signals on rails not affected by differential encoder 12 and complements the phase-ambiguity compensation of the latter by converting from the desirable rotational encoding at the output of scrambler 11 to the Gray coding required on the transmission channel. Modulator 14 pairs the baseband encoded signals on odd and even rails and applies them to respective in-phase and quadrature-phase carrier-wave components.

Demodulator 16 returns the received voiceband line signals incoming from transmission channel 15 to baseband on four rails in the illustrative embodiment. It is assumed to include carrier and timing recovery circuits and equalizers. Rotational decoder 17 reverses the encoding performed on the transmitted signals by encoder 13. Differential decoder 18 subtracts or adds successive signals on two or more rails to recover their absolute values. Descrambler 19 is the inverse of scrambler 11 and restores the received signals on all rails to plain-text form. Data sink 20 recovers the serial digital data stream or performs a demultiplexing function, if required.

FIGS. 2, 3, 4 and 5 are signal space diagrams showing a preferred encoding plan independently of the scrambling function. Each of FIGS. 2, 3, 4 and 5 is a two-dimensional plot showing the ideal locations of the tips of possible signal vectors when two orthogonal carrier waves are modulated by four-level baseband signals. The levels are designated in order of decreasing significance ABCD. The horizontal axis I (in-phase) carries odd-ordered A and C bits on discrete ±1 and ±3 unit levels. The vertical axis Q (quadrature-phase) carries the even-ordered B and D bits on discrete ±1 and ±3 unit levels. As there are sixteen possible permutations of binary digits taken four at a time, 16 small circles are shown in FIGS. 2, 3, 4 and 5, four such circles in each quadrant. As is apparent from FIG. 2, which represents the signal constellation appearing at the input to modulator 14 in FIG. 1 and ideally at the output of demodulator 16 in the absence of any coding, the most significant A and B bits encoded on respective I and Q axes are Gray coded by quadrant in the clockwise direction, i.e., 00, 01, 11 and 10. In Gray-reflected coding, successive representations change by only 1 bit. The less significant C and D bits are coded in a bilaterally symmetrical fashion about the I and Q axes. Throughout the diagram there is only one bit difference between nearest neighboring codes. The corner points (11) have only two error possibilities, the inner points (00) have four, and the remaining points have three, i.e., by being moved in a horizontal or vertical direction within the detection zone of a neighboring point. Part of the purpose of the present coding is to equalize the error probabilities for the several bits.

Figure 2:
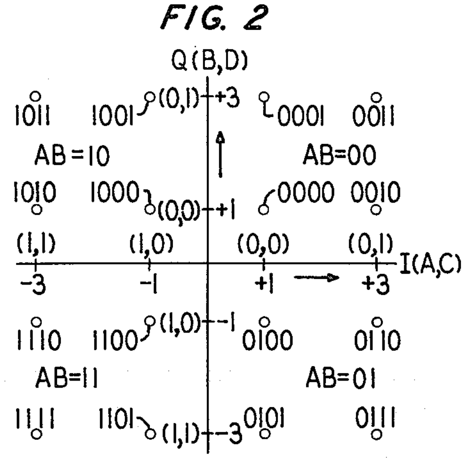
FIG. 2 is a signal space diagram of constellation of signal vectors as they appear respectively at the input of the modulator and at the output of the demodulator in a quadrature amplitude-modulated data transmission system.
Figure 3:
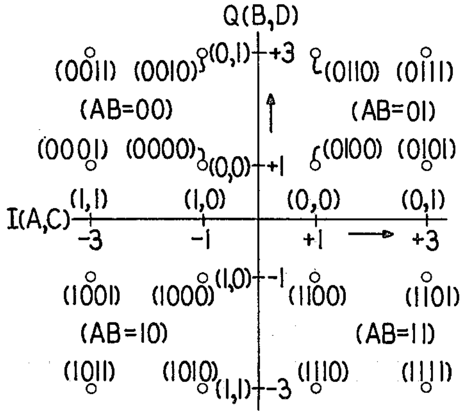
FIG. 3 is a signal space diagram of received signal vectors illustrating the presence of a rotational error.

FIG. 3 illustrates the effect of a 90° ambiguity in which the constellation of FIG. 2 is rotated through 90° in the counterclockwise direction at the output of demodulator 16. The point and quadrant designations shown in parentheses are the transmitted forms. The detected forms due to the phase rotation are the same as in FIG. 2. Thus, the outer point apparently received in the first quadrant, although transmitted as 0111, is received as 0011 (corresponding point in FIG. 2). Similarly, each of the other points is in error. However, it may be observed that, although one of the A and B bits is in error in every quadrant, the C and D bits can be made immune to quadrantal-phase ambiguities by interchanging the 01 and 10 bits in the second and fourth quadrants of FIG. 2. The C and D bits are thus Gray coded within each quadrant in a uniform counterclockwise direction. This is the Gray-to-rotational format provided by rotational decoder 17. The inverse transformation takes place at rotational encoder 13. The A and B bits are rendered relatively immune to phase ambiguities by differential encoding wherein only the incremental changes (sum or difference) between just transmitted and present incoming significant bits are transmitted instead of the absolute values.

Figure 4:
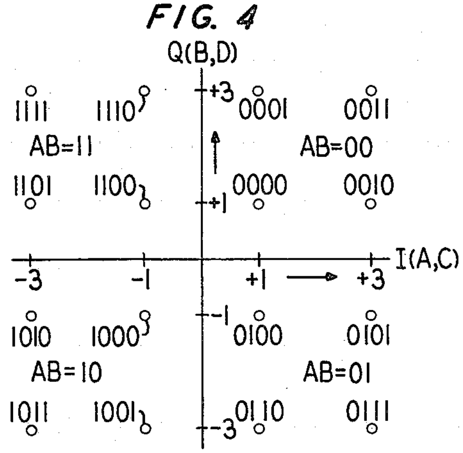
FIG. 4 is a signal space diagram of signal vectors arranged according to this invention in a format suitable for differential encoding to minimize error multiplication.

FIG. 4 illustrates the signal space diagram as seen at the output of differential decoder 18. The A and B bits are encoded binary fashion, counting in the clockwise direction, to permit binary addition and subtraction of quadrantal information. The C and D bits are rotationally encoded so that the inside corner bits in each quadrant are 00, the outside corner bits in each quadrant are 11 and the remaining bits in each quadrant are Gray coded in the counterclockwise direction in each quadrant. Rotationally encoding the C and D bits in the second and fourth quadrants has been found to require less apparatus for implementation than differential encoding of four signal rails.

Figure 5:
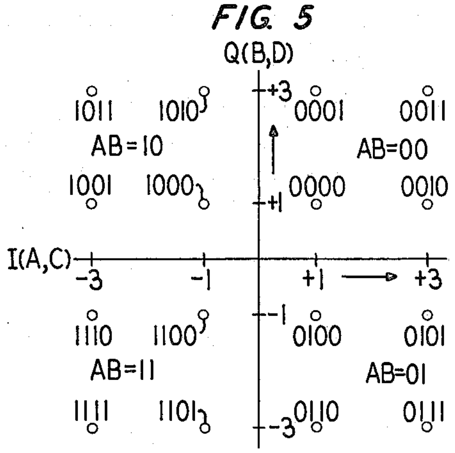
FIG. 5 is a signal space diagram of signal vectors arranged according to this invention for final detection.

FIG. 5 is the signal space diagram representing the status of signal vectors presented to data sink 20. The AB bits are restored to Gray format but the CD bits remain in rotational format.

Figure 6:
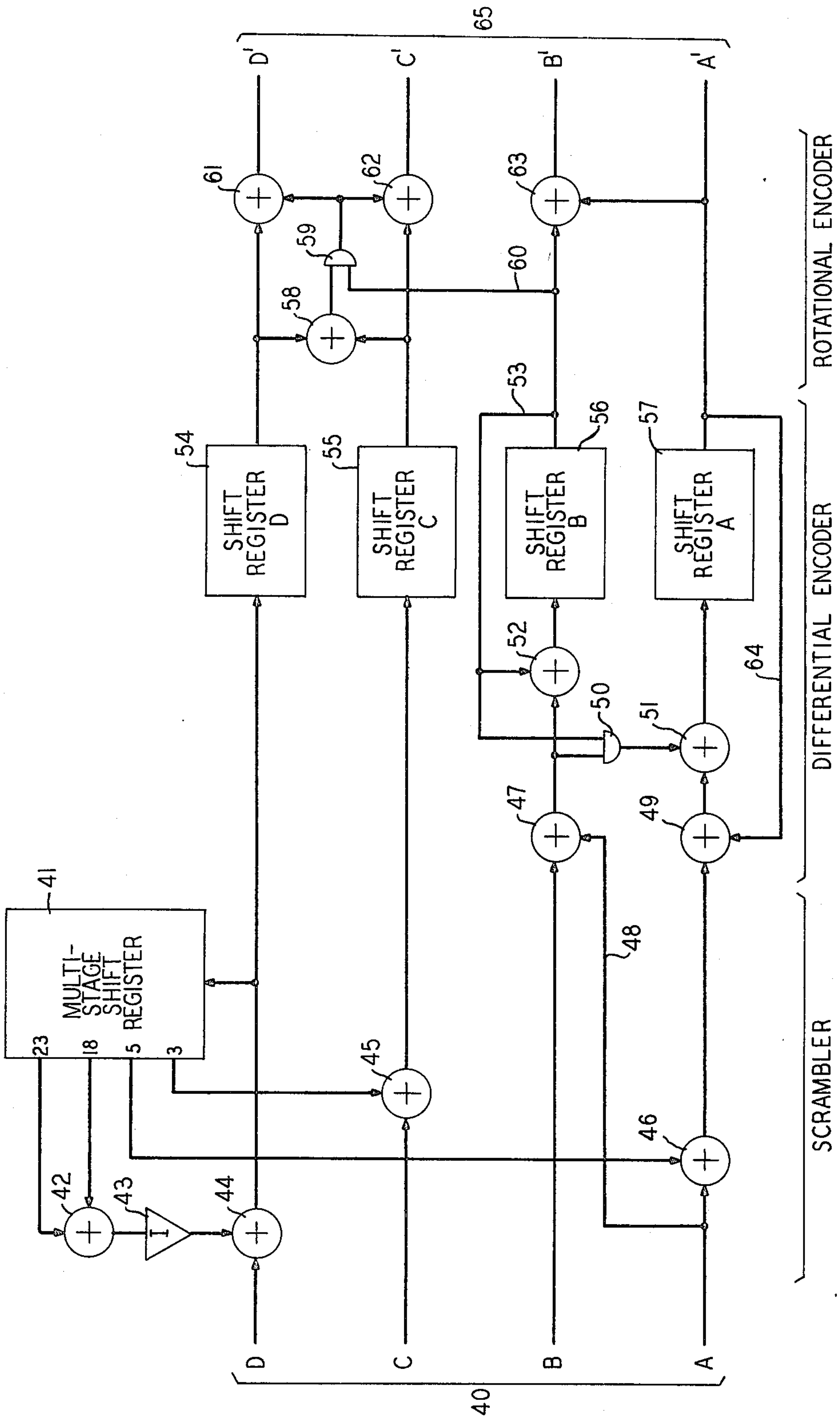
FIG. 6 is a block diagram of a scrambler-encoder according to this invention located at the transmitting terminal of a digital data transmission system.

FIG. 6 is a logic circuit diagram of the combined scrambler, differential encoder and rotational encoder of the transmitting terminal. Signals from data source 10 in FIG. 1 are split among four rails and appear at input 40 of FIG. 6 on rails A, B, C and D, decreasing in significance upward.

Binary signals on lead D are scrambled in exclusive-OR gate 44 by means of a key signal generated in multistage shift register 41, whose input is the output of gate 44. Multistage shift register 41 preferably includes a large number of stages (23 in the illustrative embodiment) to generate a maximal length pseudorandom key signal, which is effected by combining the outputs of two remote stages (18 and 23) in exclusive-OR gate 42 and inverting it in inverter 43.

The output of gate 44 is a first scrambled data signal, which also circulates through shift register 41. Delayed versions of this first scrambled data signal are available at any of the taps on the shift register. Delayed versions from stages 3 and 5 in this embodiment are combined with the A and C signal streams as shown in respective exclusive-OR gates 45 and 46 to form second and third scrambled data signals. The data signal on line B is not scrambled, to reduce error multiplication and save apparatus. There is no resulting detriment to the overall effect in practice.

Unscrambled signals on the A and B rails are combined in exclusive-OR gate 47 to transform the AB clockwise coding from the reflected Gray format of FIG. 2 to the pure binary format of FIG. 4 to assist in differentially encoding the signals on the A and B rails.

The differential encoder comprises shift registers 56 and 57 (acting as one-symbol delay units), exclusive-OR gates 49, 51 and 52 and AND-gate 50. The signals at the inputs of gates 49 and 52 are present incoming signals and those at the outputs of registers 56 and 57 are just transmitted past signals. The latter outputs are fed back by way of leads 53 and 64 to other inputs of gates 49 and 52 for effective addition therein with the present incoming signals. The incoming and just transmitted signals on the B rail are also combined in AND-gate 50 to indicate a carry which is in turn applied to exclusive-OR gate 51 to complement the previously determined differential A signal, thus effectively performing a modulo-four addition of the signals on the A and B rails. Exclusive-OR gate 63 operates on the differential outputs of registers 56 and 57 to restore the AB quadrant coding to Gray form desired on the transmission channel before modulation.

Two shift registers 54 and 55 are also provided on the C and D rails to align the transmitted C and D bits with the differentially encoded A and B bits. The rotational encoder comprises exclusive-OR gates 58, 61 and 62 and AND-gate 59. The input to AND-gate 59 over lead 60 from the B rail identifies the second and fourth quadrants of the signal constellation. Gate 58 combines the signals on the C and D rails to identify the 01 or 10 states. When the output of gate 58 is combined in AND-gate 59 with the state of the B rail, exclusive-OR gates 61 and 62 are enabled to complement the signals on the C and D rails, thus producing the inverse of the rotational encoding of the second and fourth quadrants accomplished in rotational decoder 17 at the receiver location. Strictly speaking, the rotational encoding is required at data sink 20. Rotational encoder 13 merely complements rotational decoder 17 in providing a compatible channel signal.

The coded and scrambled four-rail signals appear at output 65 on rails A', B', C' and D'.

In the event that transmission impairments occasioned, for example, by the use of a switched telephone channel rather than a conditioed private channel, limit transmission to two-level data, rails A and B only are employed. In this circumstance rotational encoding is unnecessary and only the differential encoding is needed. The signals on the B rail are then scrambled.

Figure 7:
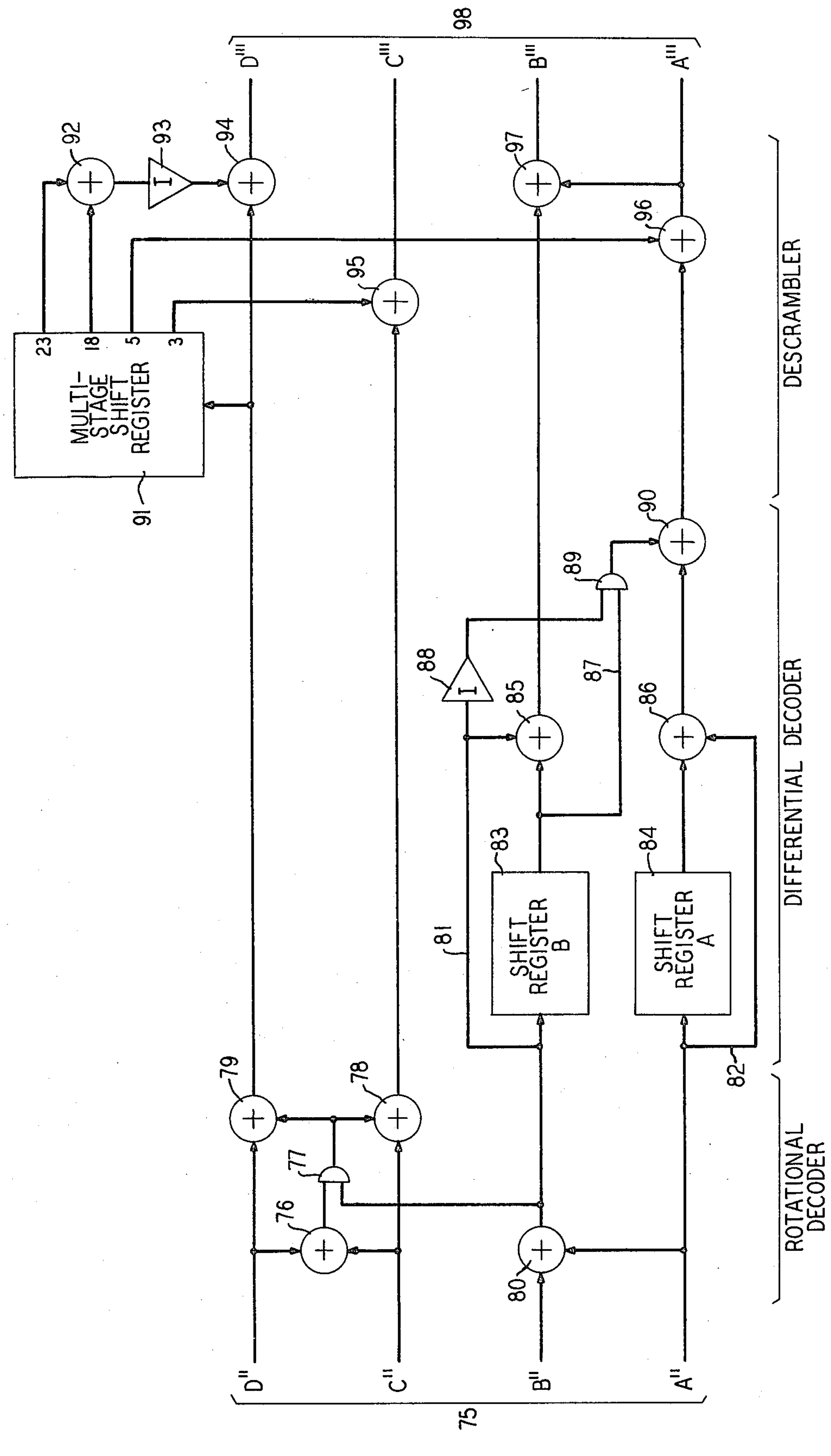
FIG. 7 is a block diagram of a descrambler-decoder according to this invention located at the receiving terminal of a digital data transmission system.

FIG. 7 illustrates the complement to FIG. 5 located at a receiving terminal. FIG. 7 is a logic circuit diagram of the combined rotational decoder, differential decoder and descrambler. The received signals after demodulation to baseband are split among four rails and appear at input 75 on rails A'', B'', C'' and D'', decreasing in significance in that order.

Bits on rails C'' and D'' are rotationally decoded in exclusive-OR gates 76, 78 and 79 and AND-gate 77. Exclusive-OR gate 80, responsive to signal bits on rails A'' and B'', binary codes the AB bits according to the signal space diagram of FIG. 4. At the same time the presence of a 1 bit on rail B'' identifies signals in the second and fourth quadrants of FIG. 4 and enables AND-gate 77. By way of exclusive-OR gate 76 the other input of AND-gate 78 is enabled when bits of opposite sense 01 and 10 appear on rails C'' and D''. When AND-gate 77 is fully enabled, the bits on rails C'' and D'' are complemented in exclusive-OR gates 78 and 79. The signal space diagram of FIG. 4 is applicable. The output of exclusive-OR gate 79 becomes the input to the descrambler.

The differential decoder, operating on the signals on rails A'' and B'', comprises delay shift registers 83 and 84, exclusive-OR gates 85, 86 and 90, inverter 88 and AND-gate 89. The decoder effectively subtracts the previous AB bits, after Gray-to-binary conversion of the AB bits in OR-gate 80, from the incoming bit pair in the outputs of registers 83 and 84 by means of exclusive-OR gates 85 and 86. The latest incoming bits are bypassed around registers 83 and 84 on leads 81 and 82 to exclusive-OR gates 85 and 86 where they are combined with the past bits delayed in shift registers 83 and 84. This bypass arrangement obviates the need for delay registers on rails C'' and D''. The state of the incoming B bit is inverted in inverter 88 and combined with the previous B bit in AND-gate 89 to cause complementation of the A bit in exclusive-OR gate 90 whenever the previous and present B bits are respectively 1 and 0. Thus, the overall function of the differential decoder is a modulo-four subtraction of the previous AB bits from the present AB bits to yield the absolute value of the transmitted AB bits. The operation of the differential encoder of FIG. 5 is thereby reversed.

The descrambler shown in FIG. 7 comprises multistage shift register 91, exclusive-OR gates 92 and 94 and inverter 93. The rotationally decoded D bits in the output of exclusive-OR gate 79 are applied as shown to the input of registers 91 and, after appropriate delays, certain predetermined bits are combined in exclusive-OR gate 92 to reconstruct a key signal matching that in the scrambler of FIG. 5. The key signal is combined with the received bits in exclusive-OR gate 94 to reconstruct the original data stream at output rail D'''. Delayed bit streams received on rail D'' are applied by way of stages 3 and 5 and exclusive-OR gates 95 and 96 to the C'' and A'' bit streams after differential decoding for descrambling purposes. The output of exclusive-OR gates 95 and 96 forms the recovered C and A bit streams on rails C''' and A'''. The descrambled A bits are combined in exclusive-OR gate 97 with the decoded B bits to form the output B bit now having a reflected Gray coding with respect to the A bit on rail B'''. The four output rails terminate at location 98.

The operation of the scrambler and encoders of FIG. 5 can be described by the following logic equations. Let the four input bits at location 40 on rails A, B, C and D by $A_i$, $B_i$, $C_i$ and $D_i$, where $i$ is a time index for bauds or symbols. An encircled plus (⊕) sign denotes the exclusive-OR operation.

At the output of the scrambler, $$SD_i = 1 \oplus D_i \oplus SD_{i-18} \oplus SD_{i-23} \quad (1)$$
$$SC_i = C_i \oplus SD_{i-3} \quad (2)$$
$$SB_i = A_i \oplus B_i \quad (3)$$
$$SA_i = A_i \oplus SD_{i-5} \quad (4)$$

The numerical subscripts on D relate to the stage of shift register 41 at which a tap is placed in a particular illustrative embodiment. The numeral one in equation (1) represents the effect of inverter 43 in FIG. 6.

The signals represented by equations (1) through (4) are applied to the differential encoder and delay shift registers 54 through 57 with the following results.

$$ED_i = SD_{i-1} \quad (5)$$
$$EC_i = SC_{i-1} \quad (6)$$
$$EB_i = EB_{i-1} \oplus SB_{i-1} \quad (7)$$
$$EA_i = EA_{i-1} \oplus SA_{i-1} \oplus [EB_{i-1} SB_{i-1}] \quad (8)$$

The signals represented by equations (5) through (8) appearing at the outputs of delay registers 54 through 57 are further operated on by the rotational encoder to produce the following signals at location 65 in FIG. 5 suitable for application to a modulator for a transmission circuit.

$$TD_i = ED_i \oplus [(EC_i \oplus ED_i) \cdot EB_i] \quad (9)$$
$$TC_i = EC_i \oplus [(EC_i \oplus ED_i) \cdot EB_i] \quad (10)$$
$$TB_i = EB_i \oplus EA_i \quad (11)$$
$$TA_i = EA_i \quad (12)$$

The signals represented by equations (9) through (12) after modulation of quadrature carrier waves, transmission over a channel and demodulation at a receiver can be represented by the symbols $RA_i$, $RB_i$, $RC_i$ and $RD_i$ effective at location 75 in FIG. 6.

The combined rotational and differential decoders of FIG. 6 produce the following results.

$$DD_i = RD_i \oplus [(RC_i \oplus RD_i) \cdot (RA_i \oplus RB_i)] \quad (13)$$
$$DC_i = RC_i \oplus [(RC_i \oplus RD_i) \cdot (RA_i \oplus RB_i)] \quad (14)$$
$$DB_i = RA_i \oplus RB_i \oplus RA_{i-1} \oplus RB_{i-1} \quad (15)$$
$$DA_i = RA_i \oplus RA_{i-1} \oplus [(RA_i \oplus RB_i \oplus 1) \cdot (RA_{i-1} \oplus RB_{i-1})] \quad (16)$$

The signals represented by equations (13) through (16) are applied to the descrambler of FIG. 7 with the following results.

$$QD_i = 1 \oplus DD_i \oplus DD_{i-18} \oplus DD_{i-23} \quad (17)$$
$$QC_i = DC_i \oplus DD_{i-3} \quad (18)$$
$$QB_i = DB_i \oplus DA_i \oplus DD_{i-5} = DB_i \oplus QA_i \quad (19)$$
$$QA_i = DA_i \oplus DD_{i-5} \quad (20)$$

A comparison of initial equations (1) through (4) with output equations (17) through (20) reveals their parallelism. In the absence of errors due to noise or other distortion on the transmission channel, these equations are valid. Analysis shows that the error probability in the A and B bits is 7/48 and in the C and D bits is 17/48, based on the signal constellation employed in the illustrative embodiment. When these probabilities are applied to the above equations and account is taken of error multiplication, an average of 4.08 output errors results from each error in a received signal bit in contrast to an error multiplication factor of six for serial transmission of the same data with the same degree of scrambling and no other coding. The error multiplication for A and B bits is 5.5 and for C and D bits, 3.5. The distribution of errors over the four rails is A:B:C:D = 1:1:1.26:1.89.

When operation is restricted to half-speed for unconditioned or switched voice channels, only the A and B bits are scrambled and differentially transmitted. Rotational encoding is omitted. The scrambler key signal is derived from the B rail. In this case for every single error occurring in transmission, an average of ten errors results in the output. The distribution of errors is A:B = 1:2.33.

While this invention has been described in terms of specific illustrative embodiments, it will be manifest they many changes and modifications can be made without departing from its essential spirit and scope as defined in the annexed claims.

What is claimed is:

1. In combination with a synchronous digital data transmission system in which multilevel symbols plottable as points on a two-dimensional four-quadrant signal space diagram are encoded on parallel bit streams, a transmitting terminal comprising:

means for differentially encoding at least the parallel streams representing the most significant bits of said multilevel symbols by continuously augmenting the last-transmittted bits by the increment between such last-transmitted bits and incoming bits therein, and means for rotationally encoding other parallel streams representing bits of lesser significance in said multilevel symbols from a uniform rotational Gray coding format throughout all quadrants of said signal space diagram to a bilaterally symmetric relationship.

2. The combination defined in claim 1 in which said differential encoding means comprises means for delaying by one synchronous symbol interval each differentially encoded bit, and means for combining each incoming bit with the previous bit from said delaying means to form differentially encoded bits.

3. The combination defined in claim 1 in which said rotational encoding means comprises means for detecting the simultaneous occurrence of bits of complementary types in parallel data streams, and means responsive to a determination that the current multilevel symbol is encoded in a predetermined quadrant for complementing the bits detected by said detecting means.

4. In combination with a synchronous digital data transmission system in which multilevel symbols plottable as points on a two-dimensional four-quadrant signal space diagram are encoded on parallel bit streams, a receiving terminal including means for decoding such parallel bit streams comprising means for rotationally decoding preselected parallel bit streams representing received multilevel symbols of one degree of significance arranged in bilaterally symmetric coding format into a uniform rotational Gray coding relationship, and means for differentially decoding at least the parallel streams representing the most significant bits of received multilevel symbols by continuously determining the increment between consecutive bits therein.

5. The combination defined in claim 4 in which said rotational decoding means comprises means for detecting the simultaneous occurrence of bits of complementary type in parallel data streams, and means responsive to a determination that the current multilevel symbol is encoded in a predetermined quadrant for complementing the bits detected by said detecting means.

6. The combination defined in claim 4 in which said differential decoding means comprises means for delaying by one synchronous symbol interval each bit to be differentially decoded, and means for combining directly received bits with previous bits from said delaying means to form differentially decoded bits.

7. In combination with a synchronous digital data transmission system in which multilevel symbols are plottable as points on a two-dimensional four-quadrant signal space diagram are encoded on parallel bit streams, a transmitting terminal comprising means responsive to one of said parallel streams for generating a pseudorandom key signal and combining said key signal with said one parallel bit stream to form a first scrambled bit stream, means for joining one or more of said other parallel bit streams with said first scrambled bit stream after discrete synchronous delay intervals to form additional scrambled bit streams, means for differentially encoding at least the parallel streams representing the most significant bits of said multilevel symbols by continuously augmenting the last-transmitted bits by the increment between such last-transmitted bits and incoming bits in such streams, and means for rotationally encoding other parallel streams representing bits of lesser significance in said multilevel symbols from a uniform rotational Gray-code format throughout all quadrants of said signal diagram to a bilaterally symmetric relationship.

8. In combination with a synchronous digital data transmission system in which multilevel symbols plottable as points on a two-dimensional four-quadrant signal space diagram have been encoded on parallel bit streams partially as augmentations of the last-transmitted values and the increments between such last-transmitted and incoming absolute values and partially from a conversion between uniform Gray-code rotational symmetry and bilateral symmetry through all quadrants of said space diagram, a receiving terminal comprising means responsive to those bit streams encoded with respect to rotational symmetry pattern for complementing bits therein exhibiting a complementary symmetry relationship when the received multilevel symbol falls in an even-ordered quadrant of said space diagram thereby transforming those bit streams exhibitng bilateral symmetry into said rotational symmetry, means responsive to the one of said parallel stream from which the scrambling key signal was derived after subjection to said complementing means for generating a pseudorandom descrambling key sig nal and combining said descrambling key signal with said last-mentioned parallel stream to form a first descrambled bit stream, means for differentially decoding at least the received parallel streams representing the most significant bits of said multilevel symbols by continuously combining consecutive bits in such streams to reconstruct absolute valued bit streams, and means for joining said bit stream from which said key signal was derived after subjection to said complementing means and after discrete synchronous delay intervals with others of said decoded parallel bit streams to form additional descrambled bit streams.

9. In combination with a synchronous digital data transmission system in which multilevel symbols plottable as points on a two-dimensional four-quadrant signal space diagram are encoded on parallel bit streams including a transmitting terminal, a transmission channel and a receiving terminal:

at said transmitting terminal including means for applying modulated signals to said channel, means for differentially encoding at least the parallel streams representing the most significant bits of said multilevel symbols by continuously augmenting the last-transmitted bits by the increments between such last-transmitted bits and incoming bits therein, and means for converting other parallel streams representing bits of lesser significance in said multilevel symbols from a uniform rotational Gray-code format throughout all quadrants of said signal space diagram to a bilaterally symmetric relationship suitable for said transmission channel, at said receiving terminal including means for demodulating signals from said channel, means for reconverting certain parallel bit streams representing received multilevel symbols of lesser significance arranged in a bilaterally symmetrical relationship into a uniform rotational Gray-code format throughout all quadrants, and means for differentially decoding at least the parallel streams representing the most significant bits of received multilevel symbols by continuously determining the increment between consecutive bits therein.

10. In combination with a synchronous digital data transmission system in which multilevel symbols plottable as points on a two-dimensional four-quadrant signal space diagram are encoded on parallel bit streams including a transmitting terminal, a transmission channel and a receiving terminal:

at said transmitting terminal including means for applying modulated signals to said channel, means responsive to one of said parallel streams for generating a pseudorandom key signal and combining said key signal with said one parallel bit stream to form a first scrambled bit stream, means for joining one or more of said other parallel bit streams with said first parallel bit stream after discrete synchronous delay intervals to form additional scrambled bit streams, means for differentially encoding at least the parallel streams representing the most significant bits of said multilevel symbols by continuously augmenting the last-transmitted bits by the increment between such last-transmitted bits and incoming bits, and means for rotationally encoding other parallel streams representing bits of lesser significance in said multilevel symbols from a uniform rotational Gray-code format throughout all quadrants of said signal diagram to a bilaterally symmetric relationship, at said receiving terminal including means for demodulating signals from said channel, means responsive to those bit streams encoded with respect to rotational symmetry pattern for complementing bits therein exhibiting a complementary symmetry relationship when the received multilevel symbol falls in an even-ordered quadrant of said space diagram thereby transforming those bit streams exhibiting bilateral symmetry into said rotational symmetry, means responsive to the one of said parallel streams from which the scrambling key signal was derived at said transmitting terminal after subjection to said complementing means for generating a pseudorandom descrambling key signal and combining said descrambling key signal with said last-mentioned parallel stream to form a first descrambled bit stream, means for differentially decoding at least the received parallel streams representing the most significant bits of said multilevel symbols by continuously combining consecutive bits in such streams to reconstruct absolute-valued bit streams, and means for joining said bit stream from which said key signal was derived after subjection to said complementing means and after discrete synchronous delay intervals with others of said decoded parallel bit streams to form additional descrambled bit streams.

* * * * *